V. A. FYNN.
ALTERNATE CURRENT MOTOR.
APPLICATION FILED MAY 26, 1910.
1,038,338.
Patented Sept. 10, 1912.
2 SHEETS—SHEET 1.
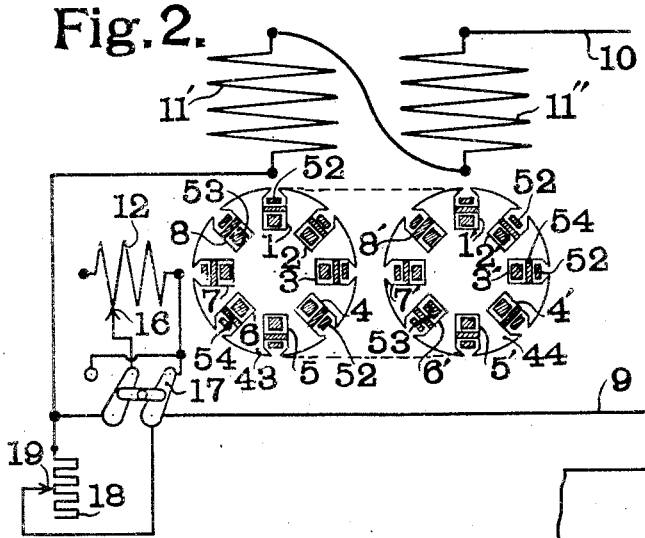
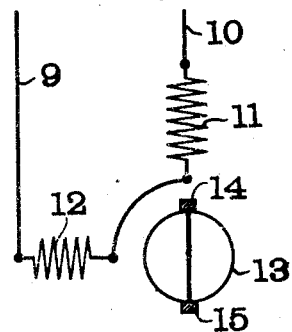
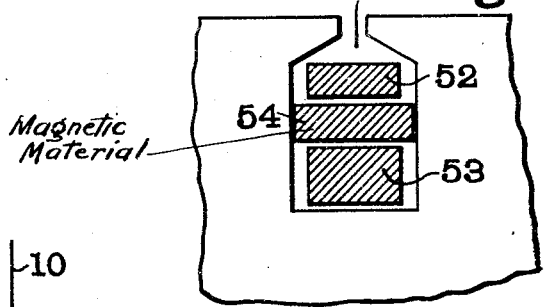
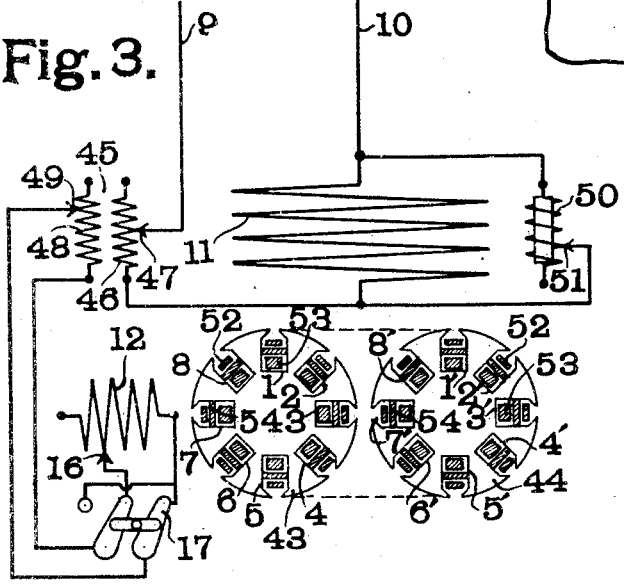
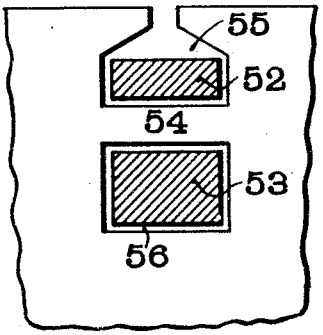
WITNESSES:
L. L. Mead.
W. A. Alexander
INVENTOR
Valère A. Fynn,
Fowler & Huffman
ATTORNEYS

V. A. FYNN.
ALTERNATE CURRENT MOTOR.
APPLICATION FILED MAY 26, 1910.

1,038,338.

Patented Sept. 10, 1912.

2 SHEETS—SHEET 2.

WITNESSES:
L. L. Mead.
W. A. Alexander

INVENTOR
Valère A. Fynn,
BY Fowler & Huffman
ATTORNEYS

UNITED STATES PATENT OFFICE.

VALÈRE ALFRED FYNN, OF LONDON, ENGLAND.

ALTERNATE-CURRENT MOTOR.

1,038,338.	Specification of Letters Patent.	Patented Sept. 10, 1912.

Application filed May 26, 1910. Serial No. 563,541.

*To all whom it may concern:*

Be it known that I, VALÈRE ALFRED FYNN, a subject of the King of England, residing at London, England, have invented a certain new and useful Alternate-Current Motor, of which the following is such a full, clear, and exact description as will enable any one skilled in the art to which it appertains to make and use the same, reference being had to the accompanying drawings, forming part of this specification.

My invention relates more particularly to single phase alternate current induction motors having a permanently short-circuited induced member such as a squirrel-cage, or to such motors having an induced winding adapted to be permanently short-circuited by means of slip rings or in some like manner.

The principal object of my invention is to cause such single phase motors to start with a powerful torque without the use of a commutator. Broadly speaking, I achieve this object by imitating in a squirrel-cage motor as closely as I can, especially at starting, the favorable conditions obtaining, for instance, in the known separately excited single phase series or shunt induction commutator motors.

My invention and its several advantages will be better understood by reference to the following description, taken in connection with the accompanying diagrammatic drawings of two pole motors, in which—

Figure 4:
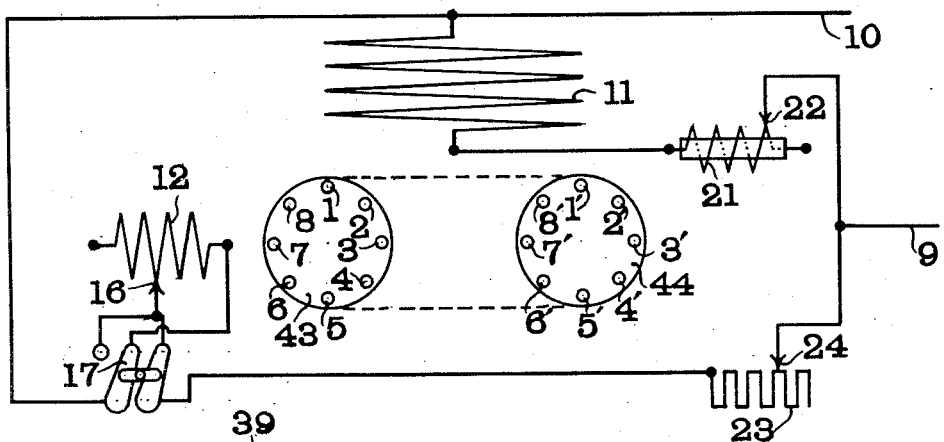
Figures 7, 8:
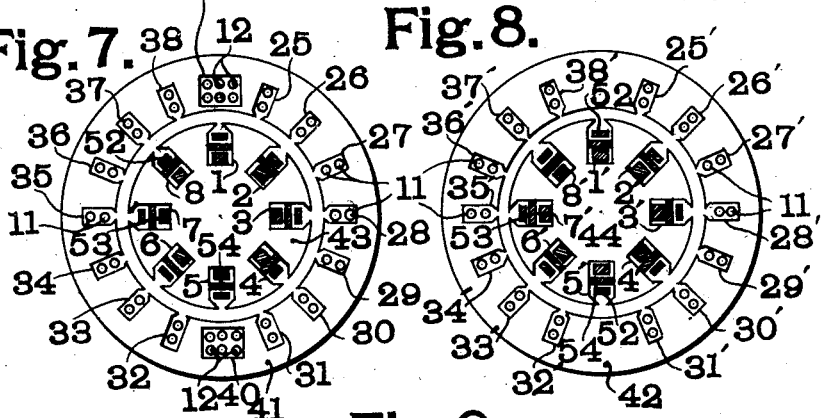
Figure 9:
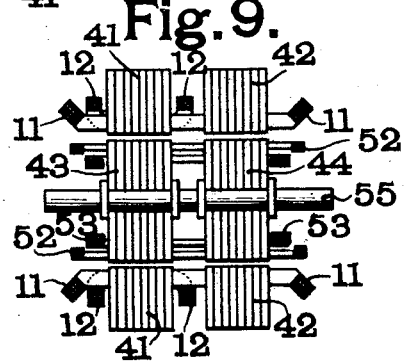

Figure 1 represents the known separately excited single phase series induction commutator motor; Fig. 2 is one diagram of connections for my improved motor; Fig. 3 shows the preferred form of stator windings; Fig. 4 is another diagram of connections for said motor; Figs. 5 and 6 show to a larger scale the preferred arrangement of windings on the induced member; Fig. 7 shows the preferred mechanical disposition of the windings on one group of stator and the corresponding group of rotor laminations, while Fig. 8 shows the preferred disposition of said windings on the other group of stator and rotor laminations; Fig. 9 illustrates one way of mechanically disposing the various elements constituting the preferred form of my improved motor.

Referring to Fig. 1, the stator carries two windings 11, 12 displaced by 90 electrical degrees or by 180/n degrees where n represents the number of poles of the machine, and connected in series relation across the mains 9, 10. It is well understood that a series relation between two windings may be obtained either by connecting them in series directly or with the interposition of a series transformer. The rotor carries a commuted winding 13, short-circuited by means of the working brushes 14, 15 along the axis of the main inducing stator winding 11. The working current is induced in 13 by 11 and the motor field is produced by the stator field winding 12. The flux due to 12 is practically in phase with the current in 12, therefore, also in phase with the current in 11 and with the induced working current in 13, thus securing a large torque per ampere at starting. This desirable phase coincidence of working current and motor flux is primarily due to the fact that the rotor is not inductively responsive along the axis of 12; it is also due to the fact that 11 and 12 are connected in series relation. Because the rotor is not inductively responsive along the axis of 12, the machine in Fig. 1 will also develop a large starting torque if 12 be connected in parallel relation to 11 but the conditions under speed will be inferior to those secured by the beforementioned series connection. My object, therefore, is to produce a squirrel-cage motor or the like having a main inducing winding and a field winding displaced therefrom and to make the inductive relation between the main inducing winding and a rotor winding as good as possible while making the inductive relation between the field winding and said rotor winding as poor as possible. I can thus secure a large rotor current along the main inducing axis with but a small flux in that axis while I can produce a large flux along the axis of the field winding without producing a large rotor current in that axis thus approaching the conditions obtaining in Fig. 1 and securing a large starting torque. To this end I provide means along one axis of the inducing member for producing a main magnetization through all the stator laminations and I dispose along another axis a field winding on the inducing member which longitudinally embraces a part only of the laminations. The rotor reactance along the field axis will thus be very much larger than along the main axis. I may use only one winding on the induced member but I prefer to use two such windings and to separate them by a magnetic bridge.

While Figs. 2, 3 and 4 are more particularly devoted to illustrating the connections of the various stator windings of my improved motor, Figs. 5 and 6 show details of the preferred rotor construction, Figs. 7 and 8 show the preferred arrangement of stator slots and Fig. 9 illustrates one way of mechanically disposing the principal elements of such motors. It is impossible to adequately illustrate all these points in a single figure; Figs. 2, 3 or 4 must, therefore, be considered in connection with Figs. 7, 8 and 9 and the descriptions of these figures will necessary overlap. In Fig. 2, both rotor and stator laminations are divided into two groups 43, 44 and 41, 42 in the manner shown in Fig. 9. The conductors of the rotor winding are carried straight through from group 43 to group 44 and the main inducing winding consists of two parts 11' and 11" each disposed on one group of stator laminations. These two parts are longitudinally displaced but they are arranged to magnetize along parallel axes because the rotor conductors are wound straight through from 43 to 44. The stator winding 12 connected in series relation with 11' and 11" is disposed on one group of stator laminations only and is displaced by 90 electrical degrees with respect to the main inducing winding 11' located on that same group of stator laminations.

Winding 12 may be referred to as the stator field winding. This winding 12 can be disposed in a plurality of slots per pole but I prefer to place it in only one slot per pole and I furthermore prefer to set said slot back from the bore of the stator so as to further diminish the mutual induction between rotor and stator along the axis of 12. This preferred construction is indicated in Fig. 7 where the stator field winding 12 is placed in the large slots or holes 39 and 40 set back from the bore of the group of stator laminations 41 inclosing the group of rotor laminations 43. The main inducing winding whether consisting of one or more parts, should be placed in as good an inductive relation with at least one rotor winding as possible and in my preferred arrangement I consequently dispose this winding in many open slots per pole. Thus the winding 11' of Fig. 2 would be located in the open stator slots 25, 26 ... 38 of the stator 41 of Fig. 7 and the winding 11" of Fig. 2 would be located in the open stator slots 25', 26' ... 38' of the stator 42 of Fig. 8. The active turns and, therefore, the ampere turns of 12 can be varied at 16 thus varying the starting current and the starting torque. Switch 17 serves to reverse the direction of the current in 12 relatively to the direction of the current in 11' and 11" and thus reverses the direction of rotation. The resistance 18, adjustable at 19 and connected in parallel with 12 serves the purpose of varying the phase of the current in the stator field winding relatively to the phase of the current in the main inducing winding. It may also be said that 18 serves the purpose of varying the phase relation between the E. M. F.'s appearing at the terminals of the main inducing winding and the stator field winding respectively. Such a phase adjustment is often desirable but need not always be provided for. When the motor has reached a sufficient speed the winding 12 may be entirely cut out of circuit.

In Fig. 2 the two groups of rotor laminations 43 and 44 carry two permanently short-circuited windings 52 and 53 located in the slots 1 to 8 on 43 and 1' to 8' on 44. They are separated in each slot by a magnetic shunt or bridge 54 so arranged that magnetic flux passing this bridge can thread one rotor winding without threading the other. This bridge is so constructed as to facilitate the production of Foucault currents therein whereby it becomes inductively responsive to a magnetic flux threading same. Fig. 5 shows this construction to a larger scale and Fig. 6 shows a modified arrangement in which the bridge is not inductively responsive and is formed by the rotor laminations themselves. One rotor winding 52 is disposed in open slots 55 located near the rotor periphery whereas the other winding is disposed in closed slots or holes 56, embedded in the rotor core. The relative space position of the two rotor windings on the two groups of rotor laminations is further illustrated in Fig. 9. Although I prefer to use two rotor windings, yet one only may be employed and can then be disposed as is winding 52. When two windings are, however, used in the manner illustrated in the various figures, then the one (52) which is placed in the best inductive relation to the main inducing winding or windings is preferably given a higher resistance than the other.

In the motor shown in Fig. 3 the main inducing winding 11 consists of coils embracing all the stator laminations. This construction is the more economical as the two longitudinally displaced groups of laminations can then be set closer to each other. This disposition of the winding 11 is also illustrated in Fig. 9. In Fig. 3 the windings 11 and 12 are connected in series relation by way of the adjustable series transformer 45. The adjustable inductive resistance or impedance 50 connected in parallel to 11 provides one way of adjusting the phase of the E. M. F. appearing at the terminals of 11 with respect to the phase of the E. M. F. appearing at the terminals of 12. After the motor has reached a sufficient speed the series transformer can be cut out of circuit and any phase adjusting devices which may have been used can be disconnected.

The modification shown in Fig. 4 illustrates the parallel connection between the main inducing and the stator field windings. In Fig. 4 the main inducing winding 11 embraces both groups of stator laminations. An inductive resistance 21 adjustable at 22 and an ohmic resistance 23 adjustable at 24, are inserted in circuit with 11 and 12 respectively as examples of means for adjusting the phase relation of the currents in the two windings or of the E. M. F.'s impressed on said windings. The starting effort can often be increased or the starting current be diminished by the use of such means. The direction of rotation can be reversed by reversing the current through 11 or 12 for instance as shown at 17. When the motor is up to speed the circuit containing 12 can be interrupted.

Although the invention has been described with reference to two-pole motors and to a revolving induced member, yet it is to be understood that it is equally applicable to motors with any number of pole pairs and that the induced member may be stationary, the inducing member being rotatable.

Having fully described my invention, what I claim as new and desire to secure by Letters Patent of the United States is:

1. In an alternating current motor, the combination with a single rotor, of a laminated stator, means for producing a main $n$-pole magnetization along one axis through all of the stator laminations, and a field winding producing a like number of poles along another axis and embracing a part only of the stator laminations.

2. In an alternating current motor, the combination with a rotor, of a laminated stator, means for producing a main $n$-pole magnetization along one axis through all of the stator laminations, a field winding producing a like number of poles along another axis and embracing a part only of the stator laminations, and means for rendering the field winding inoperative.

3. In an alternating current motor, the combination with a rotor, of a laminated stator, means for producing a main $n$-pole magnetization along one axis through all of the stator laminations, a field winding producing a like number of poles along another axis and embracing a part only of the stator laminations, and means for changing the relative direction of the main magnetization and the magnetization produced by said field winding.

4. In an alternating current motor, the combination with a rotor, of a laminated stator, means for producing a main magnetization along one axis through all of the stator laminations, a field winding disposed along another axis and embracing a part only of the stator laminations, said field winding being disposed in only one slot per pole.

5. In an alternating current motor, the combination with a rotor, of a laminated stator, means for producing a main $n$-pole magnetization along one axis through all of the stator laminations, a field winding producing a like number of poles along another axis and embracing a part only of the stator laminations, and means for controlling the phase of the magnetization due to the field winding relative to the phase of the main magnetization.

6. In an alternating current motor, the combination with a laminated stator, of a single rotor, a main inducing winding longitudinally embracing all the stator laminations, and a field winding displaced by substantially $180/n$ degrees from the main inducing winding and longitudinally embracing a part only of the stator laminations.

7. In an alternating current motor, the combination with a rotor, of a laminated stator provided with a main inducing winding embracing all the stator laminations, a field winding producing the same number of poles as the main inducing winding and embracing only a part of the stator laminations, said field winding being connected in series relation with the main inducing winding.

8. In an alternating current motor, the combination with a laminated stator, of a single rotor, a main inducing winding longitudinally embracing all the stator laminations, a field winding displaced by substantially $180/n$ degrees from the main inducing winding and longitudinally embracing a part only of the stator laminations, and means for rendering the field winding inoperative.

9. In an alternating current motor, the combination with a laminated stator, of a single rotor, a main inducing winding longitudinally embracing all the stator laminations, a field winding displaced by substantially $180/n$ degrees from the main inducing winding and longitudinally embracing a part only of the stator laminations, and means for controlling the phase of the current in the field winding relative to the phase of the current in the main inducing winding.

10. In an alternating current motor, the combination with a rotor, of a stator having two groups of laminations and provided with a main inducing winding embracing both groups of laminations, a field winding on the stator embracing only one group of stator laminations, and means for controlling the phase relation between the potentials impressed on the main and the field windings.

11. In an alternating current motor, the combination with a laminated stator, of a single rotor having a permanently short-circuited winding, a main inducing winding longitudinally embracing all the stator laminations, and a field winding displaced by substantially 180/n degrees from the main inducing winding and longitudinally embracing a part only of the stator laminations.

In testimony whereof, I have hereunto set my hand and affixed my seal in the presence of the two subscribing witnesses.

VALÈRE ALFRED FYNN. [L. s.]

Witnesses:
 E. E. Huffman,
 Elizabeth Bailey.